United States Patent [19]
Foster

[11] Patent Number: 5,680,424
[45] Date of Patent: Oct. 21, 1997

[54] PWR RADIAL REFLECTOR

[75] Inventor: John P. Foster, Monroeville, Pa.

[73] Assignee: Westinghouse Electric Corporation, Pittsburgh, Pa.

[21] Appl. No.: 608,231

[22] Filed: Feb. 28, 1996

[51] Int. Cl.⁶ .................................................. G21C 11/06
[52] U.S. Cl. .................................... 376/45.8; 376/906
[58] Field of Search .............................. 376/458, 459, 376/906, 904, 302

[56] References Cited

U.S. PATENT DOCUMENTS

| | | | |
|---|---|---|---|
| 3,573,109 | 3/1971 | Kennewick | 148/11.5 |
| 3,804,680 | 4/1974 | Martin et al. | 148/162 |
| 3,856,517 | 12/1974 | Bates et al. | 75/128 A |
| 4,011,133 | 3/1977 | Bloom et al. | 176/68 |
| 4,116,764 | 9/1978 | Jones | 376/280 |
| 4,701,299 | 10/1987 | Alibran et al. | 376/302 |
| 4,751,043 | 6/1988 | Freeman et al. | 376/458 |
| 4,849,162 | 7/1989 | Garner et al. | 376/458 |
| 4,980,117 | 12/1990 | Blaushild | 376/205 |
| 5,024,582 | 6/1991 | Bellows et al. | 416/213 R |
| 5,116,569 | 5/1992 | Kasahara et al. | 420/44 |
| 5,316,597 | 5/1994 | Kato et al. | 148/327 |
| 5,319,692 | 6/1994 | Hopkins et al. | 376/215 |

*Primary Examiner*—Daniel D. Wasil

[57] ABSTRACT

A pressurized water reactor ("PWR") radial reflector fabricated of 20% to 30% cold worked AISI Type 316 stainless steel blocks will experience about 0.14% volumetric swelling at a neutron dose level of about 100 dpa at retirement. The reflector will not be susceptible to swelling-embrittlement at retirement.

10 Claims, 1 Drawing Sheet

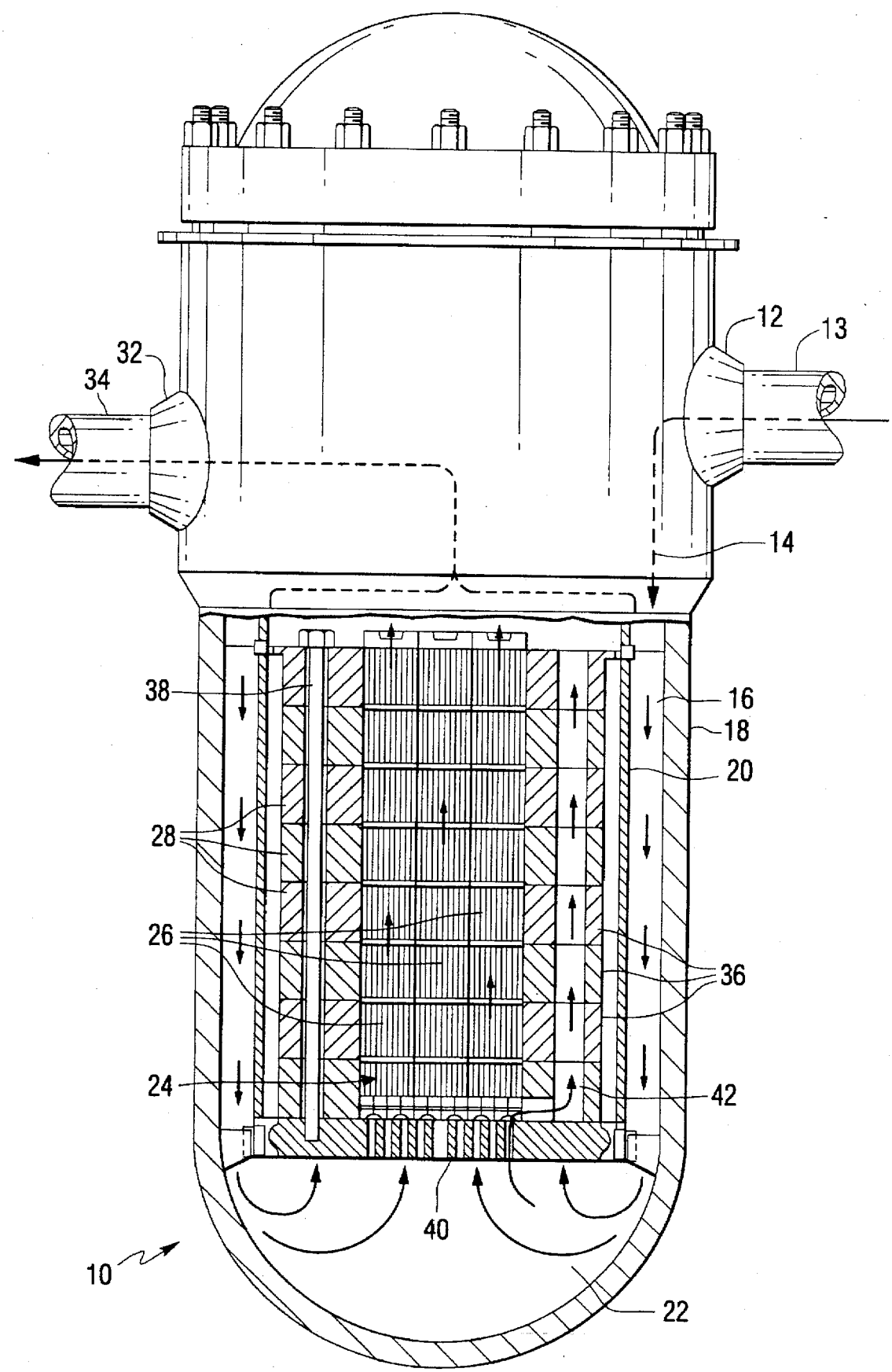

PWR RADIAL REFLECTOR

BACKGROUND OF THE INVENTION

The invention relates to a radial reflector which surrounds fuel assemblies in the active core of a pressurized water reactor (PWR) and, more particularly, to a PWR radial reflector which will not experience excessive volumetric swelling at high radiation dose levels as it reaches retirement.

Radial reflectors are designed to reflect neutron radiation back into the interior active core region of reactor vessels during power operation to improve the efficiency of the reactors and to protect the reactor vessels from the embrittling effects of years of irradiation during power operation. One commercial radial reflector design is characterized by AISI Type 304 stainless steel plates held together by AISI Type 316 stainless steel bolts. U.S. Pat. No. 4,849,162 and U.S. Pat. No. 4,701,299 disclose two other reflector designs characterized by a plurality of tightly packed, vertically standing rods and a modular lining surrounding the active core regions, respectively. U.S. Pat. No. 5,319,692 discloses a radial reflector design characterized by a stack of eight courses of large annealed 304 stainless steel reflector blocks surrounding the active core region. The blocks are held together by cold worked 316 stainless steel tie-rods and are internally cooled by primary water flowing through vertical bores in the blocks.

Undesireability, austenitic stainless steel, including 304 and 316 stainless steel and the like, internal components of reactor vessels are subject to radiation-induced volumetric swelling at operating temperatures of from about 300° C. or more in PWRs up to about 500° C. or more in high flux and fast flux reactors. In addition, it has been reported that some cold worked 316 stainless steel bolts holding annealed 304 stainless steel plates together in older PWRs have cracked and failed, which was likely due to differential swelling at high neutron dose levels toward the end of the life of the reactor. Swelling of radial reflectors is of particular concern because changes in clearances between its structrual members may result in changing coolant flow leakages from the active core region of the reactor vessel during power operations. Also, internal flow bores in the radial reflectors may swell and substantially restrict the flow of coolant therethrough.

It is known that volumetric swelling of austenitic stainless steels is caused by the radiation-induced formation of cavities at high temperatures of power operation. Also, it has been shown that the formation of cavities is affected by the helium levels of the material. Thus, the swelling behavior of austenitic stainless steels in the Oak Ridge National Laboratories High Flux Isotope Reactor or "HFIR" facility (having about 41–77 appm helium/dpa at about 9.2 to 56 dpa) is different from the swelling behavior of austenitic stainless steels in fast reactors such as the Idaho Falls National Laboratories Experimental Breeder Reator or "EBR II" (having about 0.32 appm helium/dpa at about 65 dpa) and the Fast Flux Test Facility or "FFTF" (having about 0.18–0.50 appm helium/dpa at about 38 dpa). The relatively high helium levels in the HFIR develops ultrafine helium bubbles which suppress the formation of larger so-called bias-driven voids. Also, the ultrafine bubbles result in small amounts of swelling rather than larger bias-driven voids which result in much larger amounts of swelling. See, in this regard, P. J. Maziasz, J. Nucl. Mat. 200 (1993), pp 90–107, and J. Nucl. Mat. 205 (1993) 118–145, for a report of an extensive investigation of the swelling behavior of reactor vessel internals of the HFIR facility. Similarly, see F. A. Garner, Material Science and Technology: A Comprehensive Treatment, Volume 10, Chapter 6, VCH Publishers, 1994, for a report of the swelling behavior of reactor vessel internals of fast flux reactors.

Although no direct measurements on swelling of PWR internal components have been reported, it has been recently predicted that swelling of reactor internals will be more severe in PWRs than in fast reactors, where most of the swelling data has been measured. Based upon fast breeder reactor irradiation data and on the PWR irradiation environment, it has been predicted that significant amounts of void swelling, irradiation creep and embrittlement can occur in PWR reactor internals. It has been predicted that large amounts of volumetric swelling (>10%) and severe swelling-embrittlement could possibly occur in PWR reactor internals during post shutdown handling. See, in this regard, F. A. Garner, "Problems Anticipated in Austenitic Pressure Vesssel Internals Arising from Void Swelling, irradiation Creep and Swelling-Related Embrittlement", 17th ASTM Symposium on Effects of Radiation on Materials, Sun Valley, Id., June 1994; and F. A. Garner et al., "Potential High Fluence Response of Pressure Vessel internals Contstructed from Austenitic Stainlesss Steels", Sixth International Symposium on Environmental Degradation of Materials in Nuclear Power Systems-Water Reactor, San Diego, Calif., August 1993.

It is also known that volumetric swelling can be affected by cold working. Thus, Maziasz has investigated the effect of cold work and temperature on volumetric swelling of materials similar to 316 stainless steel in the HFIR, which is summarized in relevant part by the following Table 1 (correlating the effect of cold work and temperature on volumetric swelling [as (final volume—initial volume)/initial volume] at neutron dose levels of 34 and 56 displacements per atom or "dpa"):

TABLE 1

| (dpa) | Cold Work | 300° C. | 400° C. | 500° C. |
|---|---|---|---|---|
| 34 | 0 | 0.10 | 0.18 | 5.05 |
| 34 | 20 | 0.52 | 0.18 | 0.87 |
| 56 | 0 | 0.55 0.25 | 0.32 | 6.97 |
| 56 | 20 | 0.86 0.98 | 0.54 | 1.98 |

According to Table 1, and for HFIR environments having about 41–77 appm helium/dpa at about 9.2 to 56 dpa, cold working tends to promote swelling at PWR operating temperatures of about 300° C. to about 340° C. and to inhibit swelling at higher temperatures of from about 400° C. to about 500° C.

Thus, as the experience of the nuclear industry indicates, the materials of construction of reactor internals such as PWR radial reflectors and the like and their fabrication must be carefully considered in view of volumetric swelling behavior as well as their other characteristics and properties.

SUMMARY OF THE INVENTION

It is an object of the present invention to provide a PWR radial reflector which is relatively insensitive to volumetric swelling. It is a further object to provide a radial reflector which will not exhibit swelling embrittlement when the reactor is retired.

With these objects in view, the present invention resides in a PWR radial reflector fabricated of plates or blocks of cold worked stainless steel including: about 16–18% chromium; about 10–14% nickel; and about 2–3% molybdenum. It has been found that cold worked Type 316 stainless steel subjected to the relatively high helium levels of PWRs (compared with fast neutron spectrum reactors, although significantly less than the higher helium levels of HFIR levels) will develop ultra fine bubbles in the internal components, which inhibit the formation of large swell-creating voids and a tendency to form bias voids. Thus, the swelling experienced at dose levels of about 100 dpa when the components are retired will be substantially less than expected. Preferably, the stainless steel reflector is cold worked (engineering strain) at least 15%, e.g., between about 20% and 30%, and, most preferably, about 25% to develop uniform physical properties with sufficiently low swelling levels to substantially avoid swelling embrittlement.

BRIEF DESCRIPTION OF THE DRAWINGS

The invention as set forth in the claims will become more apparent from the following detailed description of a preferred embodiment thereof shown, by way of example only, in the accompanying drawings, wherein:

FIG. 1 is a partially fragmented view of a reactor vessel showing a radial reflector in the active core region.

DESCRIPTION OF THE PREFERRED EMBODIMENT

Referring now to FIG. 1, there is shown a PWR reactor vessel 10 having an inlet nozzle 12 connected with a cold leg 13 from a steam generator (not shown). Primary water (or coolant) 14 flows through the inlet nozzle 12 and then downwardly through the annulus 16 between a reactor vessel wall 18 and a core barrel 20. The coolant reverses direction in a plenum 22 and then flows upwardly through the active core region 24 where it is heated by fuel assemblies 26 surrounded by a radial reflector 28. The heated primary water then flows from the reactor vessel 10 through an outlet nozzle 32 and to the steam generator by a hot leg 34. At power, the pressure vessel 10 operates at pressures of about 2000 to about 2500 psi or more and at temperatures of from about 300° C. to about 340° C.

The radial reflector 28 is preferably a stack of blocks 36 which are held together and to a lower core support plate 40 by tie-rods 38. In a preferred stack design, there are eight courses of blocks 36 and each course has one circumferential block 36. In another design embodying the present invention, flanged or welded plates are employed in place of the blocks 36. The blocks 36 have vertically extending bores such as bore 42 which are sized to permit sufficient coolant to flow in parallel with the coolant flowing through the fuel assemblies to cool the blocks 36. The reactor vessel 10 and internals are disclosed in more depth by U.S. Pat. No. 5,319,692, which is incorporated by this reference for its disclosure of the structure and function of the assembly. The blocks 36 are fabricated of cold worked 316 stainless steel, and preferably both the tie-rods 38 are fabricated of 316 stainless steel in order to provide an assembly wherein the principal structural components have the same characteristics. Type 316 stainless steels generally include about: 16–18% chromium, 10–14 nickel, 2–3% molybdenum, 2% manganese (max.), 1% silicon (max.), 0.08% carbon (max.) [or 0.03% carbon (max.) for 316L], 0.045% phosphorus (max.), and 0.03% sulfur (max.). It has been shown that at least 0.4% silicon and about 0.04–0.1% phosphorus tend to reduce swelling in annealed Fe—25Ni—15Cr materials of EBR-II (which inherently has relatively low helium levels). In a preferred embodiment of the present invention, the blocks of the radial reflector are fabricated of cold worked 316 stainless steels having from about 0.3% to about 0.5% silicon and about 0.04–1% or more phosphorus, and most preferably 0.4% silicon and 1.0% phosphorus, to control swelling in a PWR. In another preferred embodiment, the blocks 36 are fabricated of a 316L stainless steel composition.

Although the literature predicted that 316 stainless steel internal components would extensively swell at retirement (when the neutron dose level would be about 100 dpa or more), an examination of 316 stainless steel material irradiated in a PWR for eleven effective full power years (resulting in a neutron dose level of 35 dpa) was conducted in an effort to predict its swelling behavior at retirement. Thin-foil specimens were prepared from 3 mm diameter discs taken from a cold worked 316 stainless steel flux-thimble tube irradiated in a PWR at a temperature of between 315° C. and 325° C. (which resulted in a dose ratio of 5.9 appm helium/dpa at 35 dpa). The discs were mechanically thinned to approximately 100 mm prior by electropolishing in a 20% perchloric acid-80% methanol solution at approximately −35° C. using a twin jet polishing unit. The specimens were subsequently examined in a Philips CM12 analytical electron microscope operated at 120 kV or in a Philips CM30 analytical electron microscope operated at 300 kV.

The examination showed that neutron irradiation to a dose level of 35 dpa at about 320° C. develops a uniform distribution of dislocation loops, stacking faults and isolated dislocations. The dislocation loops ranged from approximately 3 to 18 nm (nanometers) in size. "Black spot" damage was also observed. Several examples of martensite were found in the vicinity of the grain boundaries. Of particular regard to swelling, these specimens were found to contain cavities with diameters of approximately 1 nm uniformly distributed throughout the matrix. The measured number density of these nanocavities was approximately $6 \times 10^{23}/m^3$. These cavities were observed under kinematic imaging conditions to exhibit the typical contrast for under-focus (brightly imaging) and overfocus (darkly imaging) conditions. Such nanocavities were not observed in other specimens irradiated to dose levels up to at least 15 dpa.

The swelling was calculated to be less than 0.1% [(final volume—initial volume)/initial volume], based upon the 1 nm cavities and a number density of $6 \times 10^{23}/m^3$. It was observed that this is less than the volumetric swelling which Maziasz has determined is experienced by 20% cold worked 316 stainless steel materials in HFIR or in FFTF facilities. It was also observed that the cavity diameter and density of the PWR specimens were similar to the results reported by Maziasz even though the relative helium level of a PWR (5.9 appm helium/dpa at a dose level of 35 dpa) is significantly lower than the helium level of a HFIR (41–47 helium appm/dpa at a dose level of 9.2 to 56 dpa).

The dose dependent retirement age (about 100 dpa) swelling of 316 stainless steel material in PWRs was projected from the test data taken at 35 dpa by using a power law swelling model. This model is represented by the formula:

$$\frac{(\text{Final Volume} - \text{Initial Volume})}{\text{Initial Volume}} = A(\text{dose})^n$$

where (Final Volume—Initial Volume)/Initial Volume is the volumetric swelling, and "A" and "n" are material constants with "n" equal to 1.5. Thus, it has been determined that, at an end of life of about 100 dpa, a PWR cold worked 316 radial reflector will experience a swelling about 0.14% rather than the >10% predicted by the literature.

Importantly, coolant flows through and between the structural members of PWR radial reflectors will be substantially unaffected by volumetric swelling. Also, swelling on the order of about 0.14% will not subject the reflectors to swelling induced embrittlement mechanisms.

While a present preferred embodiment of the present invention has been shown and described, it is to be understood that the invention may be otherwise variously embodied within the scope of the following claims of invention.

I claim:

1. A PWR radial reflector having plates or blocks fabricated of a cold worked austenitic stainless steel composition, the composition including: about 16–18% chromium, about 10–14% nickel, about 2–3% molybdenum, 2% manganese (maximum) and 0.08% carbon (maximum).

2. The PWR radial reflector of claim 1 fabricated of courses of internally bored blocks of cold worked stainless steel.

3. The PWR radial reflector of claim 2 including tie-rods for holding the blocks together, the tie-rods fabricated of a cold worked austenitic stainless steel composition, the composition including: about 16–18% chromium, about 10–14% nickel, about 2–3% molybdenum, 2% manganese (maximum) and 0.08% carbon (maximum).

4. The PWR radial reflector of claim 2 wherein the stainless steel composition includes from about 0.3% to about 0.5% silicon.

5. The PWR radial reflector of claim 2 wherein the stainless steel composition includes from about 0.04% to about 1.0% phosphorus.

6. The PWR radial reflector of claim 2 wherein the blocks are between about 20% and 30% cold worked (engineering strain).

7. The PWR radial reflector of claim 2 wherein the blocks are 25% cold worked (engineering strain).

8. The PWR radial reflector of claim 2 characterized by blocks having about 35 displacements per atom and a swelling characteristic of less than about 0.1% at about 35 displacements per atom.

9. The PWR radial reflector of claim 2 characterized by blocks having about 100 dpa and a swelling characteristic of about 0.14% at about 100 dpa.

10. The PWR radial reflector of claim 2 wherein the composition includes 0.03% carbon (maximum).

* * * * *